US012676692B2

(12) United States Patent
Chen

(10) Patent No.: US 12,676,692 B2
(45) Date of Patent: Jul. 7, 2026

(54) MULTI-TONE JAMMER MITIGATION

(71) Applicant: QUALCOMM Incorporated, San Diego, CA (US)

(72) Inventor: Shiou-Hung Chen, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 18/322,671

(22) Filed: May 24, 2023

(65) Prior Publication Data

US 2024/0396661 A1 Nov. 28, 2024

(51) Int. Cl.
*H04K 3/00* (2006.01)

(52) U.S. Cl.
CPC ................. *H04K 3/22* (2013.01); *H04K 3/25* (2013.01)

(58) Field of Classification Search
CPC .................................. H04K 3/22; H04K 3/25
USPC .......................................................... 455/296
See application file for complete search history.

(56) References Cited

U.S. PATENT DOCUMENTS

2008/0143580 A1* 6/2008 Glazko .................. H04K 3/228 342/17
2009/0268788 A1* 10/2009 Simic ..................... H04K 3/224 375/150
2021/0067163 A1 3/2021 Karandikar et al.

OTHER PUBLICATIONS

IEEE: "IEEE Standard for Information Technology—telecommunications and Information Exchange Between Systems—local and Metropolitan Area Networks—specific Requirements—Part 19: TV White Space Coexistence Methods—Amendment 1: Coexistence Methods for Geo-location Capable Devices Operating Under General", IEEE Standard, IEEE, Piscataway, NJ USA, Dec. 11, 2017, 295 Pages, XP068123626, the whole document.

International Search Report and Written Opinion—PCT/US2024/024019—ISA/EPO—Jul. 10, 2024.

Shoreh M.H., et al., "Design and Implementation of Spectrally-Encoded Spread-Time CDMA Transceiver", IEEE Communications Letters, vol. 18, No. 5, May 2014, pp. 741-744, XP011548746, the whole document.

* cited by examiner

*Primary Examiner* — Michael R Neff
(74) *Attorney, Agent, or Firm* — Weaver Austin Villeneuve & Sampson LLP

(57) ABSTRACT

A multi-tone jammer mitigation method includes: obtaining, wirelessly at an apparatus, a first jammer signal with a first frequency; obtaining, wirelessly at the apparatus, a second jammer signal with a second frequency; determining at the apparatus that the first jammer signal and the second jammer signal comprise a multi-tone jammer; and inhibiting, at the apparatus based on the first jammer signal and the second jammer signal comprising the multi-tone jammer, processing of the first jammer signal by the apparatus.

16 Claims, 10 Drawing Sheets

MULTI-TONE JAMMER MITIGATION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax®), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Positions of devices, such as mobile devices, may be determined using terrestrial-based positioning signals and/or non-terrestrial network (NTN) signals such as satellite positioning signals and/or positioning signals from aerial vehicles, etc. Satellite positioning system receivers may be included in various devices for receiving and measuring satellite positioning signals. Measurements of the satellite positioning signals may be processed to determine position information, such as ranges between satellites and the receiver and/or a position estimate for the receiver.

SUMMARY

An example apparatus includes: one or more receivers configured to obtain, wirelessly, a first jammer signal with a first frequency, and configured to obtain, wirelessly, a second jammer signal with a second frequency; one or more processors, communicatively coupled to the one or more receivers; wherein the one or more processors are configured to: determine that the first jammer signal and the second jammer signal comprise a multi-tone jammer; and inhibit, based on the first jammer signal and the second jammer signal comprising the multi-tone jammer, processing of the first jammer signal by the one or more processors.

An example multi-tone jammer mitigation method includes: obtaining, wirelessly at an apparatus, a first jammer signal with a first frequency; obtaining, wirelessly at the apparatus, a second jammer signal with a second frequency; determining at the apparatus that the first jammer signal and the second jammer signal comprise a multi-tone jammer; and inhibiting, at the apparatus based on the first jammer signal and the second jammer signal comprising the multi-tone jammer, processing of the first jammer signal by the apparatus.

Another example apparatus includes: means for obtaining, wirelessly, a first jammer signal with a first frequency; means for obtaining, wirelessly, a second jammer signal with a second frequency; means for determining that the first jammer signal and the second jammer signal comprise a multi-tone jammer; and means for inhibiting, based on the first jammer signal and the second jammer signal comprising the multi-tone jammer, processing of the first jammer signal by the apparatus.

An example non-transitory, processor-readable storage medium includes processor-readable instructions to cause one or more processors, of an apparatus, to: obtain a first jammer signal with a first frequency; obtain a second jammer signal with a second frequency; determine that the first jammer signal and the second jammer signal comprise a multi-tone jammer; and inhibit, based on the first jammer signal and the second jammer signal comprising the multi-tone jammer, processing of the first jammer signal by the apparatus.

In another example, utilizing on-the-fly spectrum analysis logic may identify jammers and may determine if any pair of jammers form a multi-tone jammer. The multi-tone jammer(s) may be mitigated, e.g., by having one or more of the jammers forming the multitoned jammer(s) suppressed, e.g., by one or more notch filters. If there are multiple multi-tone jammers, then the pair(s) with the strongest strength may be given higher priority for suppression, e.g., by one or more notch filters.

DETAILED DESCRIPTION

Figure 1:
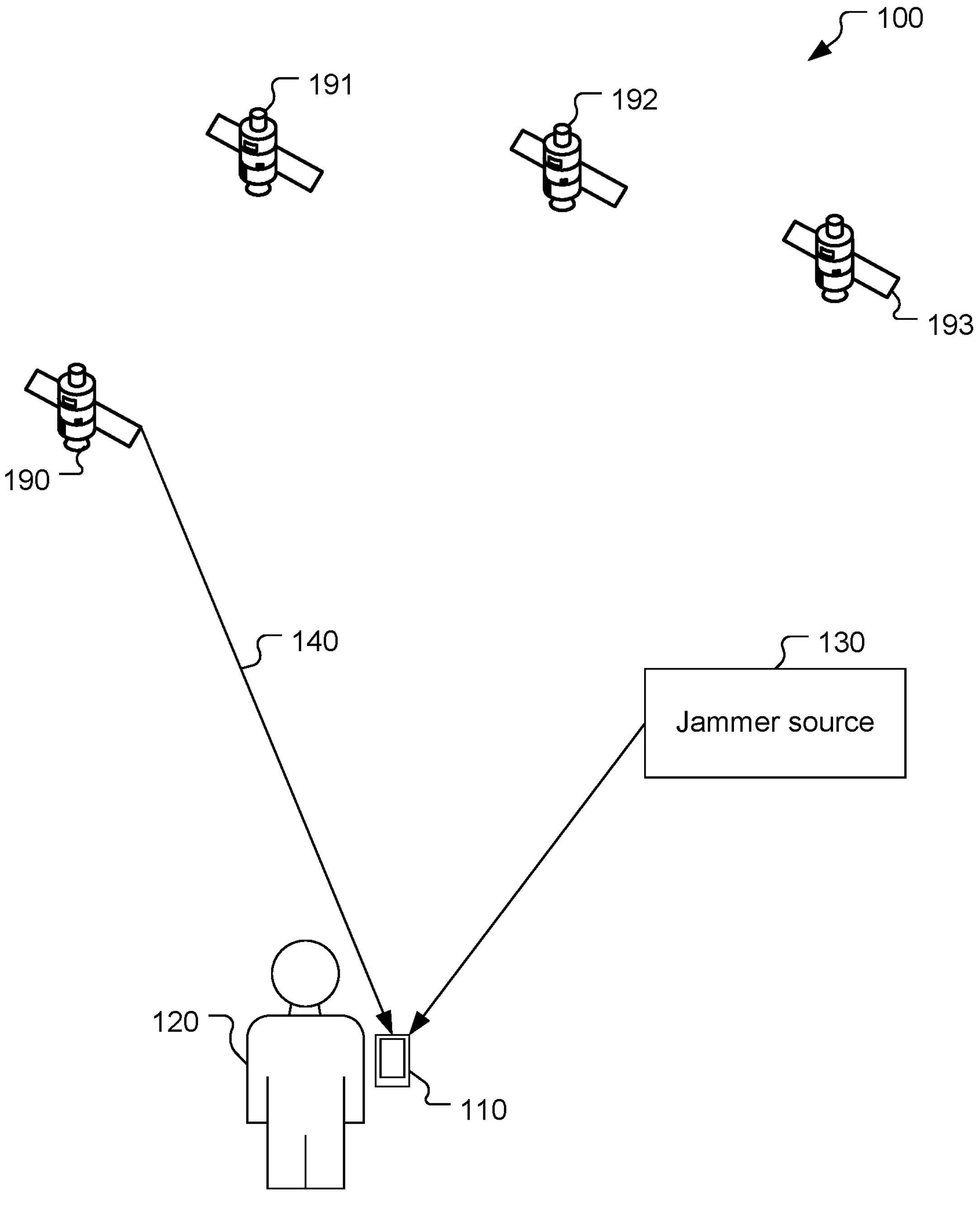
FIG. 1 is a simplified diagram of a navigation environment.

Techniques are discussed herein for mitigating the impact of the presence of multi-tone jamming signals, e.g., on positioning performance of a mobile device. For example, a mobile device may receive true satellite positioning signals and jamming signals that form one or more multi-tone jamming signals and possibly one or more single-tone jamming signals (in addition to the single-tone jamming signals that together form each of the one or more multi-tone jamming signals). The mobile device may selectively inhibit processing of the multi-tone jamming signal(s). For example, a processor may control a notch filter to suppress a jamming signal of the multi-tone jamming signal from reaching a processor for use in determining position information (e.g., a pseudorange, a position estimate, etc.). If insufficient jamming signal inhibitors are available for inhibiting all jamming signals received by the mobile device, then the processor may prioritize which jamming signal(s) to inhibit, e.g., based on likely impact to positioning accuracy of the mobile device. These are examples, and other examples may be implemented.

Items and/or techniques described herein may provide one or more of the following capabilities, as well as other capabilities not mentioned. Positioning accuracy in the presence of one or more multi-tone jamming signals may be improved. Multi-tone jamming signals may be inhibited more efficiently than with prior systems. A multi-tone jamming signal may be prioritized for mitigation in the presence of one or more other multi-tone jamming signals and/or one or more single-tone jamming signals. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms “user equipment” (UE) and “base station” are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term “UE” may be referred to interchangeably as an “access terminal” or “AT,” a “client device,” a “wireless device,” a “subscriber device.” a “subscriber terminal,” a “subscriber station,” a “user terminal” or UT, a “mobile terminal,” a “mobile station,” a “mobile device,” or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

Referring to FIG. 1, in a navigation environment 100, a UE 110 associated with (e.g., held by) a user 120 may receive satellite signals from satellites 190, 191, 192, 193 of a Satellite Positioning System (SPS) in the presence of a jammer source 130. For example, the UE 110 may receive SV signals 140 from the SV 190. The satellites 190-193 may be members of a single satellite constellation, i.e., a group of satellites that are part of a system, e.g., controlled by a common entity such as a government, and orbiting in complementary orbits to facilitate determining positions of entities around the world. Alternatively, the satellites 190-193 may be portions of two or more different satellite constellations, although each of the satellites 190-193 will typically belong to a single satellite constellation. The satellites 190-193 may be, for example, members of an SPS (e.g., a Global Navigation Satellite System (GNSS)) like the Global Positioning System (GPS) such as the Global Navigation Satellite System (GLONASS), Galileo, or Beidou or some other local or regional SPS such as the Indian Regional Navigational Satellite System (IRNSS), the European Geostationary Navigation Overlay Service (EGNOS), the Quasi-Zenith Satellite System (QZSS, also called Michibiki), or the Wide Area Augmentation System (WAAS). Various receiver configurations may be used to receive satellite signals. For example, a receiver may use separate receive chains for different frequency bands. As another example, a receiver may use a common receive chain for multiple frequency bands that are close in frequency, for example L2, L5, and L6 bands. As another example, a receiver may use separate receive chains for different signals in the same band, for example GPS L1 and GLONASS L1 sub-bands. A single receiver may use a combination of two or more of these examples. These configurations are examples, and other configurations are possible.

Multiple satellite bands are allocated to satellite usage. These bands include the L-band, used for GNSS satellite communications, the C-band, used for communications satellites such as television broadcast satellites, the X-band, used by the military and for RADAR applications, and the Ku-band (primarily downlink communication) and the Ka-band (primarily uplink communications), the Ku and Ka bands used for communications satellites. The L-band is defined by IEEE as the frequency range from 1 to 2 GHZ. The L-Band is utilized by the GNSS satellite constellations such as GPS, Galileo, GLONASS, and BeiDou, and is broken into various bands, including L1, L2, L5, and L6. For location purposes, the L1 band has historically been used by commercial GNSS receivers. However, measuring GNSS signals across more than one band may provide for improved accuracy and availability.

Figure 2:
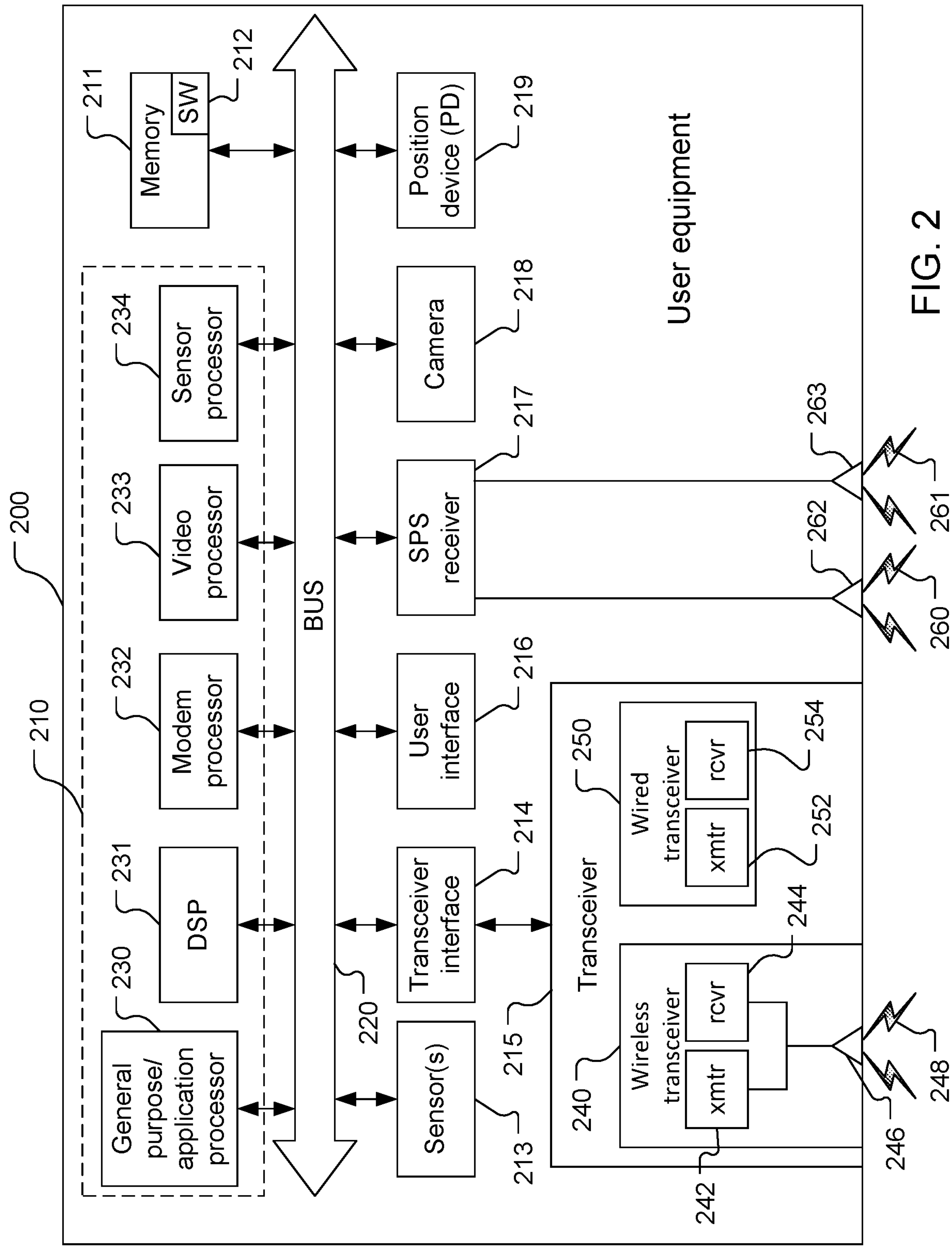
FIG. 2 is a block diagram of components of an example user equipment shown in FIG. 1.

Referring also to FIG. 2, a UE 200 may be an example of the UE 110 and may comprise a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with a network, e.g., an NG-RAN, to send communications to, and receive communications from, the network. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The SPS receiver 217 (e.g., a Global Positioning System (GPS) receiver) may be capable of receiving and acquiring SPS signals 260, 261 via SPS antennas 262, 263. The SPS antennas 262, 263 are configured to transduce the SPS signals 260, 261 from wireless signals to received signals, e.g., electrical or optical signals, and may be integrated with the antenna 246. The SPS receiver 217 may be configured to process, in whole or in part, the acquired SPS signals 260, 261 for estimating a location of the UE 200. For example, the SPS receiver 217 may be configured to determine location of the UE 200 by trilateration using the SPS signals 260, 261. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260, 261 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, 261, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
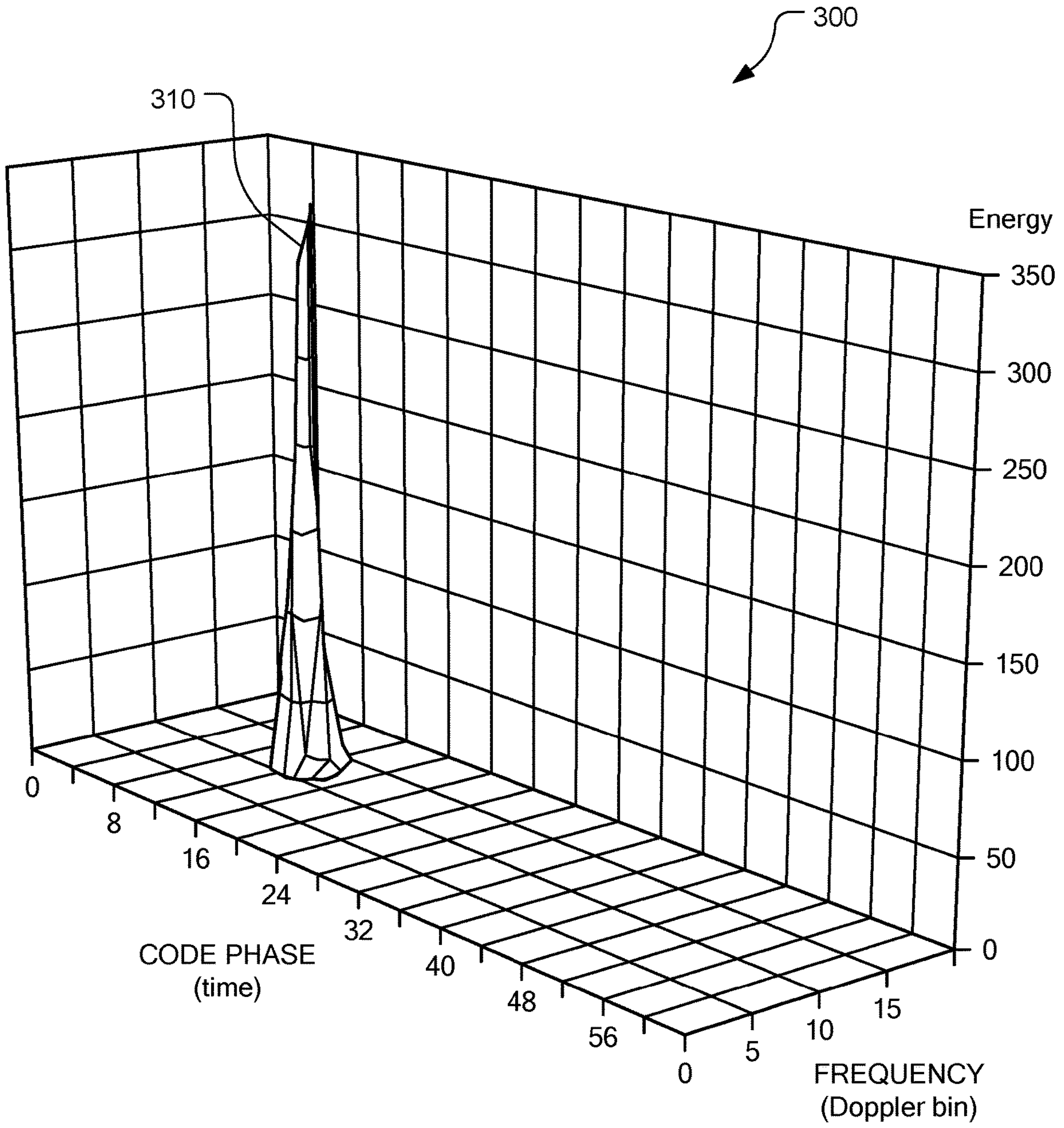
FIG. 3 is a graph of a signal correlation plot showing a peak of a true satellite positioning signal.

Referring again to FIG. 1, with further reference to FIG. 3, an SPS signal may be encoded with a repeating sequential code. A receiver, e.g., in the UE 110, may attempt to determine a pseudorange measurement from a received SPS signal based, at least in part, on a code phase associated with the received SPS signal. Here, for example, such a receiver may detect such a code phase based upon a location of an energy peak 310 of a signal correlation plot 300 within a code phase search window. The peak 310 provides a clear time of arrival of an incoming SV signal, e.g., the SV signal 140, which may be used to determine an accurate pseudorange, which may be used to determine an accurate position estimate of the UE 110. The presence jamming, however, may increase the incidence of false alarms (e.g., detected peaks that do not belong to a true SPS signal).

The jammer source 130 may transmit signals that may inhibit the UE 110 from accurately determining a location of the UE 110 and/or from providing signal measurements from which another entity may accurately determine the location of the UE 110. SPS signals are typically very weak at the surface of the Earth and jamming signals may cause true SPS signals to be missed and/or jamming signals to be taken as SPS signals, possibly resulting in erroneous position estimates. Jamming signals may be intentional and/or accidental, and may be produced by a source other than the UE 110, e.g., by the jammer source 130, and/or produced by the UE 110. Jamming signals may be referred to herein as jammers or jammer signals.

Figure 4:
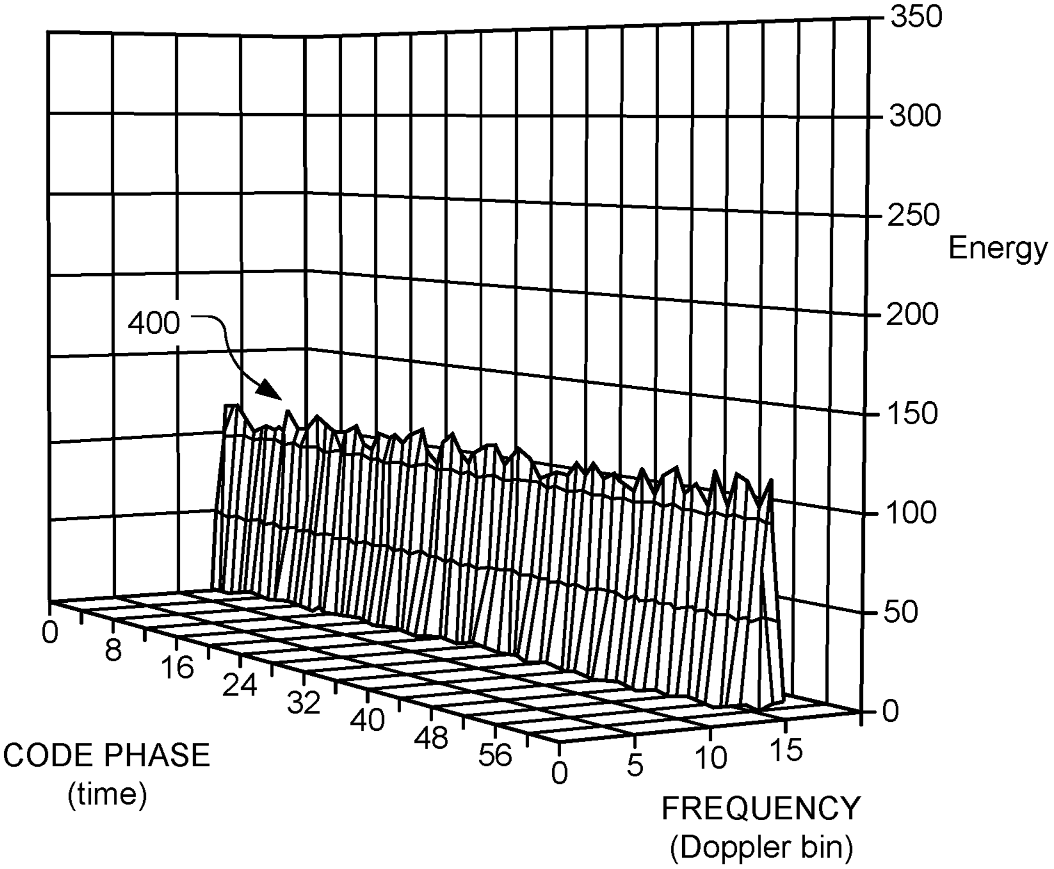
FIG. 4 is a graph of a signal correlation plot showing an energy ridge corresponding to a single-tone jamming signal.
Figure 5:
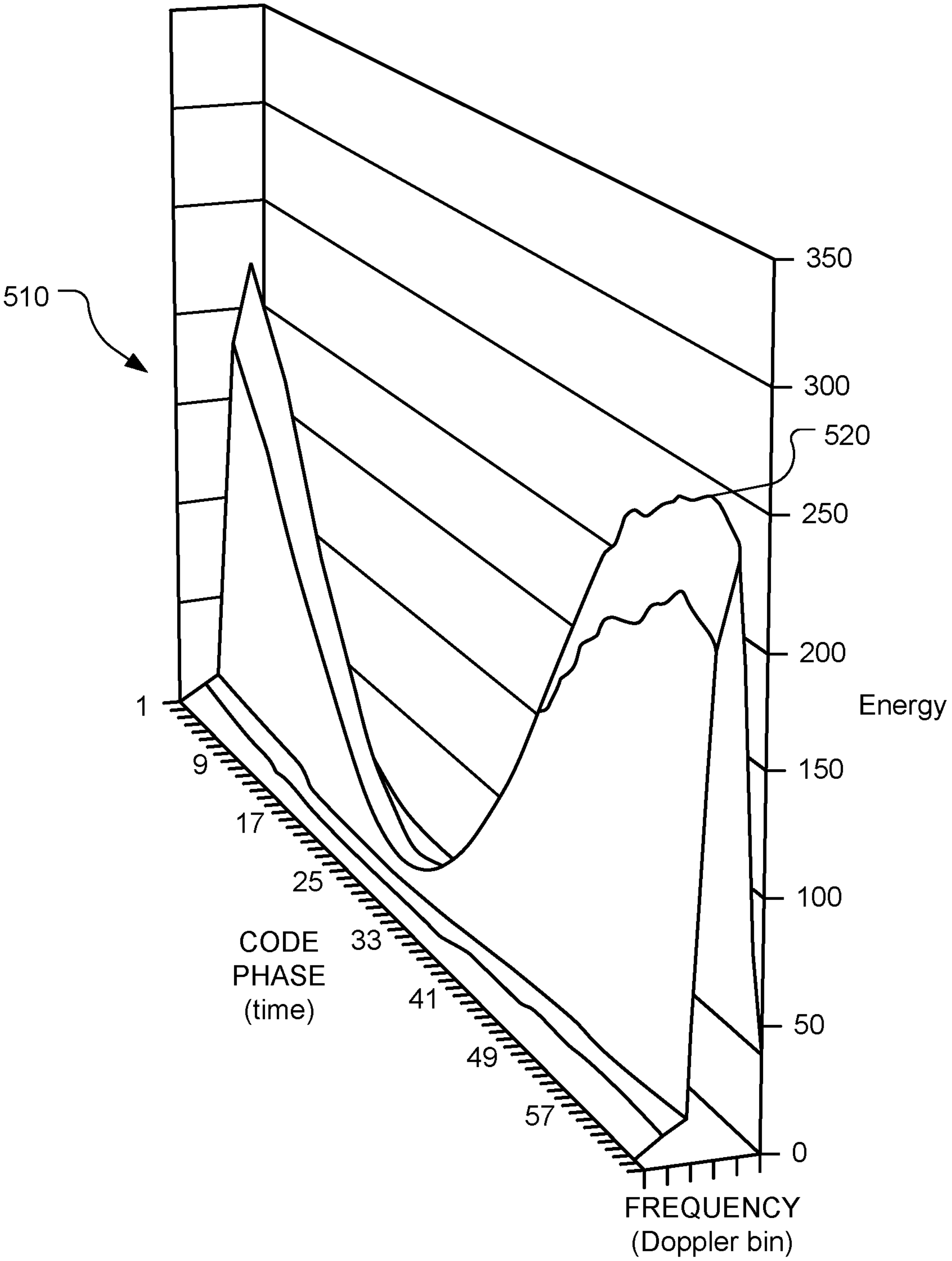
FIG. 5 is a graph of a signal correlation plot showing a sinusoidal-type pattern of a multi-tone jamming signal.

Referring also to FIG. 4 and FIG. 5, jamming signals may be single-tone jammers or multi-tone jammers. As shown in FIG. 4, a single-tone jammer may produce a substantially uniform energy ridge 400, above a threshold power level, at a particular Doppler frequency across code phase (time) in a code phase search window. The single-tone jammer may flood an entire frequency bin. Techniques are known for removing energy from such a single-tone jammer by, for example, detecting such a substantially uniform energy ridge at a particular Doppler frequency above a threshold power level and filtering the particular Doppler frequency. Removal of such energy from a code phase search window may reduce the incidence of false alarms that may result from such a uniform edge, but if a true signal peak (of a true SPS signal) falls in the frequency bin that is removed, then the true signal peak will not be detected. A multi-tone jammer comprises multiple single-tone jammers that are displaced in frequency by an integer multiple of kHz. As shown in FIG. 5, a multi-tone jammer may produce energy that varies non-uniformly in a Doppler regions across a code phase search window. As shown, a plot 510 varies approximately sinusoidally across code phase, providing a substantially sinusoidal ridge in a frequency bin as a function of code phase. Such a non-uniformly varying energy of a multi-tone jammer in a code phase search window may result in a mistaken identification of a peak 520 of the multi-tone jammer as a true SPS signal peak, and the corresponding timing used to determine a pseudorange. This pseudorange may be used to determine a position estimate of a UE, with the position estimate being erroneous due to mistaken use of the SV signal peak.

Previous SPS receivers have been more tolerant of single-tone jamming signals than multi-tone jamming signals. Such receivers were able to identify single-tone jamming signals, e.g., by identifying a signal with an average power level above a threshold power level, and not using the identifies single-tone jamming signals to determine a position estimate. Such receivers, however, may accidentally identify a portion of a multi-tone jamming signal energy distribution as a true SV signal peak and erroneously use such a peak to determine an inaccurate position estimate.

Figure 6:
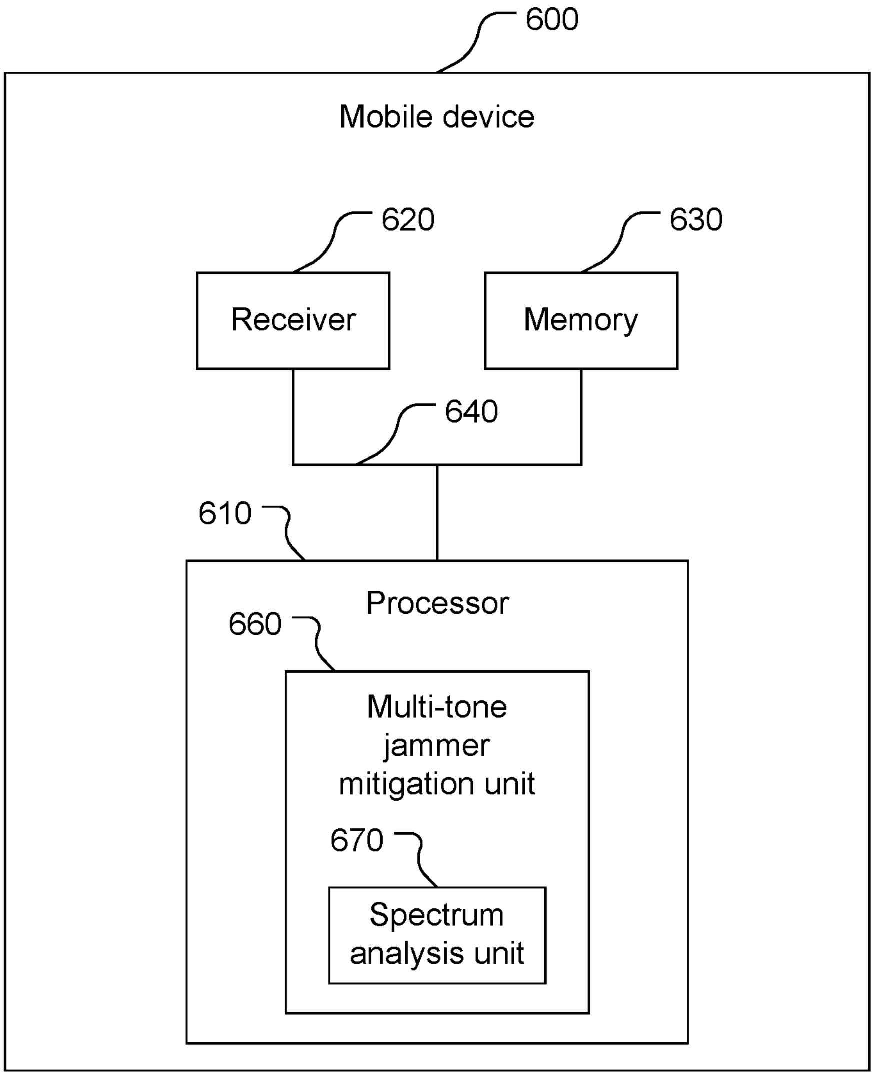
FIG. 6 is a block diagram of an example of a mobile device shown in FIG. 1.

Referring to FIG. 6, with further reference to FIGS. 1-4, a mobile device 600 includes a processor 610, a receiver 620, and a memory 630 communicatively coupled to each other by a bus 640. Although referred to in the singular herein, the processor 610 may comprise one or more processors, the receiver 620 may comprises one or more receivers, and/or the memory 630 may comprise one or more memories. The mobile device 600 may include some or all of the components shown in FIG. 6, and may include one or more other components such as any of those shown in FIG. 2 such that the UE 200 may be an example of the mobile device 600. The mobile device 600 may not be configured for wireless communication. The processor 610 may include one or more components of the processor 210. The receiver 620 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the receiver 620 may include the wired transmitter 252 and/or the wired receiver 254. The receiver 620 may include the SPS receiver 217 and the antennas 262, 263 to receive and process satellite signals of different frequencies (e.g., from different frequency bands). The memory 630 may be configured similarly to the memory 211, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the mobile device 600 performing a function as shorthand for one or more appropriate components (e.g., the processor 610 and the memory 630) of the mobile device 600 performing the function. The processor 610 (possibly in conjunction with the memory 630 and, as appropriate, the receiver 620) may include a multi-tone jammer mitigation unit 660, which may include a spectrum analysis unit 670. The multi-tone jammer mitigation unit 660 may be configured to perform one or more functions for inhibiting one or more component jamming signals of each of one or more multi-tone jamming signals from being processed for determining position information (e.g., one or more pseudoranges, a position estimate, etc.), with the mobile device 600 being configured to perform the function (s). The spectrum analysis unit 670 may be configured to identify the jamming signal(s).

Figure 7:
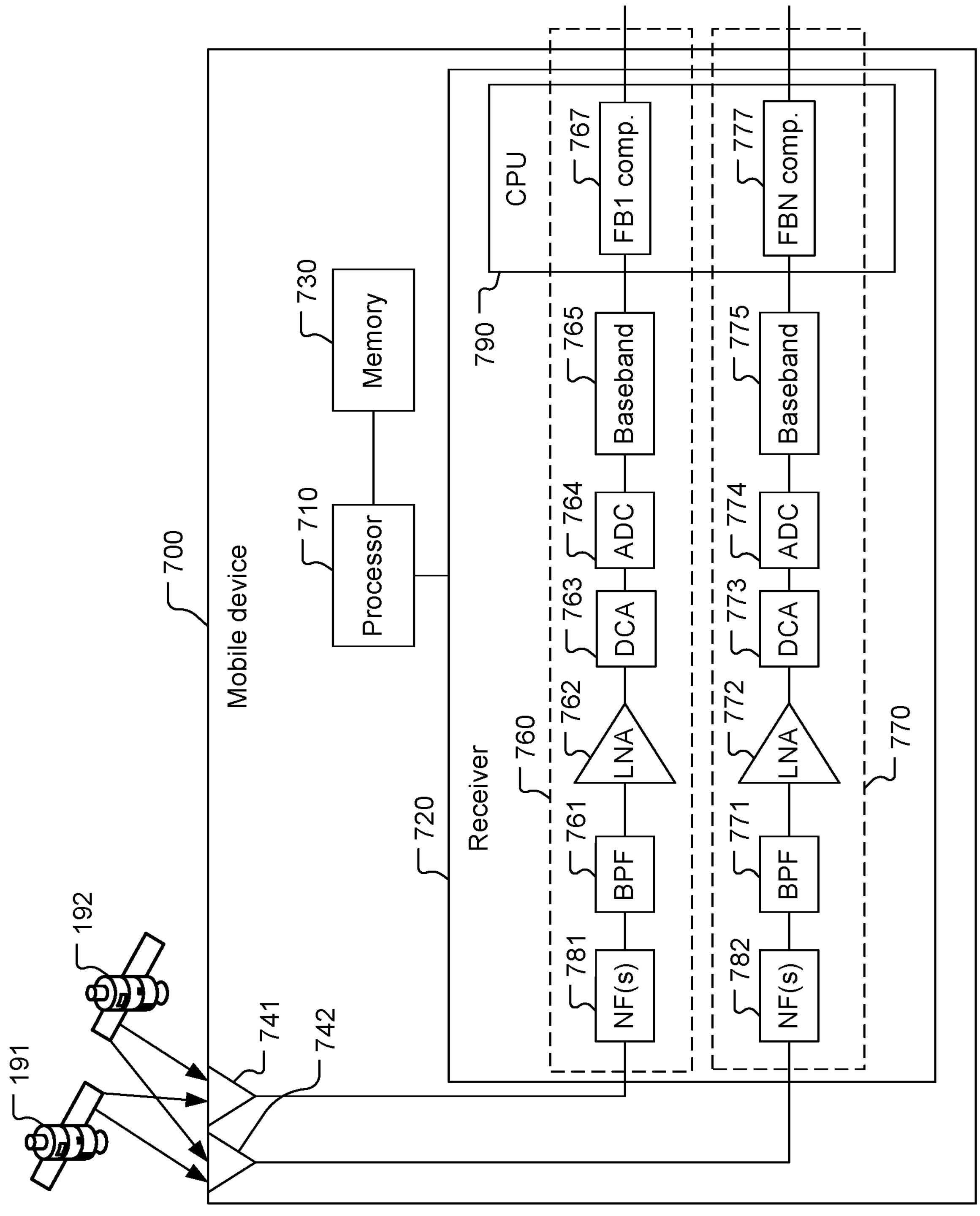
FIG. 7 is a block diagram of an example of the mobile device shown in FIG. 6.

Referring also to FIG. 7, a mobile device 700, which may be an example of the mobile device 600, includes a processor 710, a memory 730, and a receiver 720. In this example, the receiver 720 includes a first receive chain 760, and a second receive chain 770. Receive chains may be referred to as RF paths (radio frequency paths). The receiver 720 may include antennas 741, 742 (although the antennas 741, 742 are shown outside of the receiver 720) configured to receive and convert wireless SV signals into guided signals (e.g., electronic signals). The processor 710, as discussed further herein, may be configured to identify multi-tone jammers and to inhibit processing by the processor of one or more component jamming signals. The processor 710 may be configured to inhibit (e.g., reject (e.g., using one or more notch filters)) the jamming signal(s) that may have the greatest effect on performance of the mobile device 700 regarding positioning, e.g., the greatest effect on operation of the mobile device 700 to determine accurate position information (e.g., pseudorange(s), or position estimate, etc.). The processor 710, the receiver 720, and the memory 730 may be examples of the processor 610, the receiver 620, and the memory 630. While SV signals are assumed for this discussion, and thus an SPS receiver is assumed, the receiver 720 may be a receiver configured to receive and process one or more non-SV signals (e.g., other NTN (Non-Terrestrial Network) positioning signals and/or TN (Terrestrial Network) positioning signals) instead of or in addition to one or more SV signals.

The receiver 720 in this example includes multiple receive chains 760, 770 for measuring satellite signals of different frequency ranges. This is an example, and another receive chain quantity (e.g., one, or three or more) may be used. The satellite signals may have frequencies in different but overlapping ranges of frequencies (with one or more shared frequencies), or in separate (non-overlapping) ranges of frequencies (with no shared frequency). The receive chains 760, 770 may, for example, be configured to measure satellite signals in the L1 and L2/L5/L6 bands, respectively, although this is an example and not limiting of the disclosure as either or both of the receive chains 760, 770 may be configured to measure signals of other frequencies or frequency bands, and/or other receive chains may be included in the mobile device 700.

The receive chains 760, 770 include respective components for measuring satellite signals, and are (in this example) connected to different respective antennas, here the antennas 741, 742, although multiple receive chains may be connected to the same antenna. The frequency ranges corresponding to the receive chains 760, 770 may differ enough such that separate, differently-configured antennas are used to transduce respective satellite signals for the receive chains 760, 770. The antennas 741, 742 may be considered to be included in the receive chains 760, 770.

The receive chain 760 includes a BPF 761 (bandpass filter), an LNA 762 (low-noise amplifier), a DCA 763 (Digital Controlled Amplifier for down-conversion, signal conditioning/filtering, and amplification), an ADC 764 (analog-to-digital converter), a baseband block 765, and a computational block 767. The BPF 761 is configured to pass signals of frequencies within a desired frequency range, e.g., the L1 band, with little if any attenuation, and to significantly attenuate signals of frequencies outside the desired frequency band of the BPF 761. The LNA 762 (e.g., an extremely-low-noise amplifier) is configured to amplify signals passed by the BPF 761. A further BPF may be disposed between the LNA 762 and the DCA 763. The DCA 763 (which may be called a PGA (programmable gain amplifier) and which may be a portion of an RFIC (Radio Frequency Integrated Circuit)) is configured to down convert the analog amplified signals output by the LNA 762 to a baseband frequency, to perform signal conditioning and/or filtering (e.g., anti-aliasing filtering), and amplification in addition to the amplification by the LNA 762. The ADC 764 is configured to convert the analog signals output by the DCA 763 into digital signals. The baseband block 765 is configured to perform intense signal processing of correlating the digital signals output by the ADC 764 with respective reference pseudorandom signals (e.g., Gold codes) by integrating the signals (e.g., for 1 ms) and using the integrated signals for further processing to determine whether the correlation results have sufficient energy to indicate a true signal. The ADC 764 and the baseband block 765 may be portions of a modem of the mobile device 700. The computational block 767, which here is a portion of a CPU 790 (Central Processing Unit), is configured to perform one or more computations on the signals output by the baseband block 765 to determine one or more satellite signal parameters (e.g., pseudorange, $CN_0$ (carrier-to-noise-density ratio, also referred to as C/No), Doppler, carrier phase, etc.). The computational block 767 comprises a portion of the CPU 790 for performing computations for the receive chain 760, namely corresponding to signals in the desired frequency band of the BPF 761. Thus, the computational block 767 is shown as being for computation for frequency band 1 (FB1). The CPU 790 may be a portion of the processor 710.

The receive chain 770 includes a BPF 771, an LNA 772, a DCA 773, an ADC 774, a baseband block 775, and a computational block 777. The BPF 771 is configured to pass signals of frequencies within a desired frequency range, e.g., the L2/L5/L6 bands, with little if any attenuation, and to significantly attenuate signals of frequencies outside the desired frequency band of the BPF 771. The LNA 772, DCA 773, ADC 774, baseband block 775, and computational block 777 are configured similarly to the LNA 762, DCA 763, ADC 764, baseband block 765, and computational block 767, but configured, as appropriate, for processing signals corresponding to signals of the desired frequency of the BPF 771. Thus, the computational block 777 is shown as being for computation for frequency band N (FBN), as there may be N receive chains, with N being an integer of two or greater. A further BPF may be disposed between the LNA 772 and the DCA 773. The DCA 773 may be a portion of the RFIC and the ADC 774 and the baseband block 775 may be portions of the modem.

The receive chain 760 also includes one or more jamming signal inhibitors 781 and the receive chain 770 also includes one or more jamming signal inhibitors 782. This is an example, and one of the receive chains 760, 770 may not include a jamming signal inhibitor. The locations of the jamming signal inhibitors 781, 782 are examples, and either of the jamming signal inhibitors 781, 782 may be disposed elsewhere in the respective receive chain 760, 770, e.g., anywhere between the respective antenna 741, 742 and the respective baseband block 765, 775 (i.e., upstream of the respective baseband block 765, 775). Also, a quantity of jamming signal inhibitors in the jamming signal inhibitor(s) 781 may differ from a quantity of jamming signal inhibitors in the jamming signal inhibitor(s) 782. The jamming signal inhibitor(s) 781, 782 may comprise one or more notch filters (NFs), e.g., one or more variable notch filters configured to have an adjustable reject frequency (e.g., a frequency of highest attenuation) that may be selected by the processor 710. The processor 710 may be configured to determine a desired reject frequency and control an appropriate one of the jamming signal inhibitor (s0 781, 782 (e.g., by sending a command signal) to adjust a respective reject frequency to the desired reject frequency. The processor 710 may determine multiple frequencies to reject and may cause each of multiple adjustable notch filters to reject a respective frequency (which will attenuate a range of frequencies around the reject frequency) up to an available quantity of notch filters of the mobile device 700.

Figure 10:
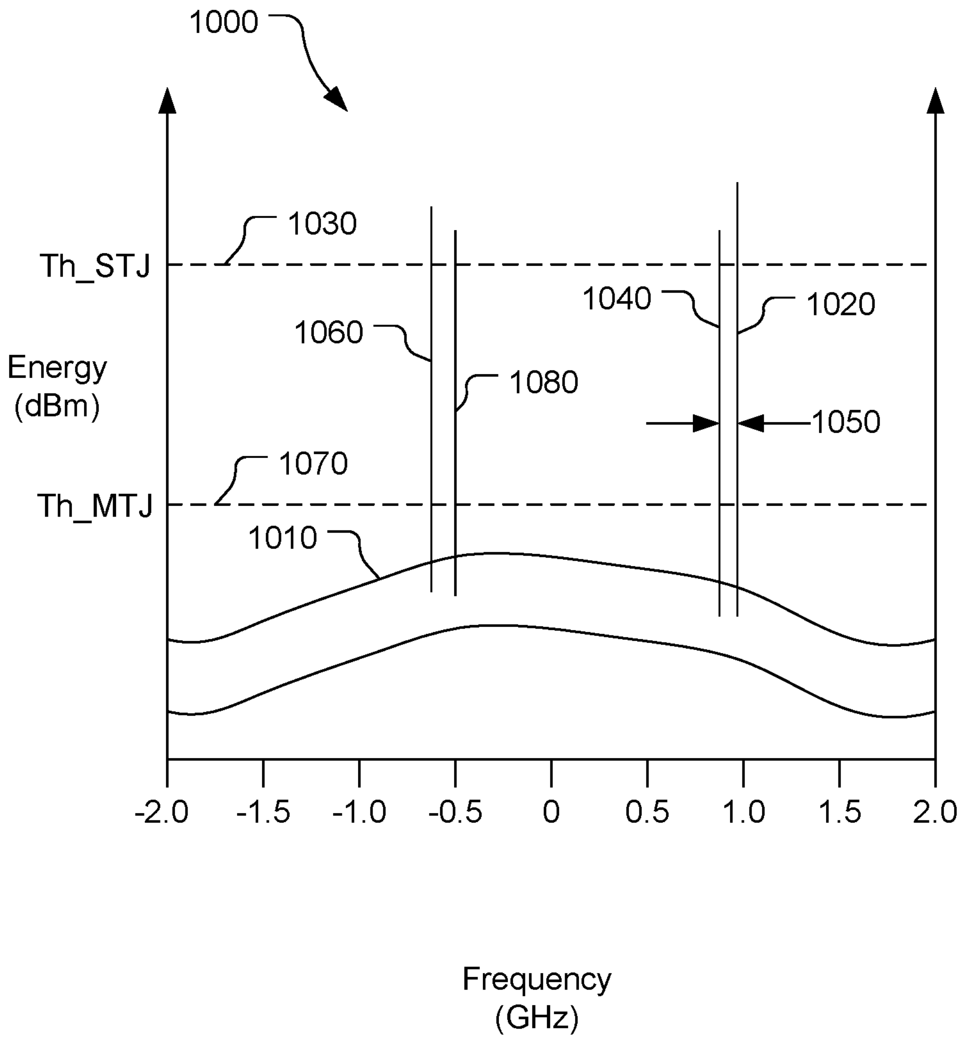
FIG. 10 is a spectral analysis plot of signal energy and frequency.

Referring also to FIG. 10, the mobile device 700, e.g., the spectrum analysis unit 670 of the processor 710, may be configured to perform spectrum analysis on received signals to identify jamming signals and frequencies of the jamming signals. For example, the CPU 790 may be configured to perform intermittent (e.g., periodic) digital analysis of received signals to determine signal properties, e.g., frequencies, signal strengths, etc. An energy vs. frequency plot 1000 shows energy that may be evaluated by the spectrum analysis unit 670, with the spectrum analysis unit 670 analyzing observations taken before correlation (e.g., at an input to the baseband block 765). Energy may be received by the mobile device 700 in an energy band 1010 around a noise floor (e.g., −170 dBm, −110 dBm, or another value). The processor 710 may be configured to identify single-tone jamming signals by determining that a signal strength of a signal exceeds a threshold strength. For example, the spectrum analysis unit 670 may determine that the energy level of a signal 1020 exceeds a single-tone-jammer threshold 1030. The processor 710 may be configured to identity multi-tone jamming signals, e.g., by identifying multiple single-tone jamming signals (e.g., the signal 1020 and a signal 1040) that are separated in frequency from each other by an integer multiple of kilohertz (kHz), e.g. a frequency separation 1050 of N KHz.

The processor 710 may be configured to identify the jamming signal(s) that may have a largest impact on positioning performance of the mobile device and inhibit processing by the processor 710 of the identified signal(s), e.g., by controlling the jamming signal inhibitors 781, 782 to inhibit the jamming signal(s) from reaching the CPU 790. For example, the processor 710 may prioritize inhibiting multi-tone jammers (e.g., inhibiting at least one jammer of a pair of jammers forming a multi-tone jammer) over inhibiting single-tone jammers that are not part of a multi-tone jammer. The processor 710 may be configured to prioritize multiple multi-tone jammers for mitigation. For example, the processor 710 may be configured to determine a strength of a multi-tone jammer (e.g., a sum of energy of the jamming signals forming the multi-tone jammer) and a frequency spacing of a pair jammers making up the multi-tone jammer. The processor 710 may be configured to selectively inhibit one or more jammer signals based on periods of each of multiple multi-tone jammers (of sinusoidal ridges). Because a single-tone jammer is less likely to be mistaken for a legitimate SPS signal than a multi-tone jammer, and because the energy profile (e.g., see FIG. 4 and FIG. 5) of a longer period multi-tone jammer is closer to a single-tone jammer than a shorter-period multi-tone jammer, the processor 710 may give higher priority to inhibiting the multi-tone jammer with a shorter period. As the sinusoidal frequency of a multi-tone jammer is a function of the frequency separation of the single-tone jammers making up the multi-tone jammer, the multi-tone jammer with a shorter period may be identified based on the separations of the respective single-tone jammers of each of the multi-tone jammers. With the multi-tone jammer identified for suppression, the processor 710 may control a signal inhibitor to inhibit the stronger signal of the pair of jammers forming the multi-tone jammer. As another example, the processor 710 may be configured to determine an inhibiting priority between a multi-tone jammer and a single-tone jammer (e.g., where only one signal inhibitor is available). The processor 710 may determine which of the single-tone jammer or the multi-tone jammer exceeds a respective tolerance level (e.g., threshold energy level) more. For example, the processor may determine $$\max(E\_STJ-Th\_STJ, E\_MTJ-Th\_MTJ) \tag{1}$$

where E_STJ is the energy in a single-tone jammer, Th_STJ is the single-tone energy threshold, e.g., the threshold 1030, E_MTJ is the energy of a multi-tone jammer (e.g., a sum of energies of the component jammers of the multi-tone jammer), and Th_MTJ is a multi-tone energy threshold, e.g., a multi-tone-jammer threshold 1070. The multi-tone energy threshold may be different from (e.g., less than, such as half of) the single-tone energy threshold. The processor 710 may determine that the jammer with the larger differential to the respective threshold as determined according to Expression (1) should receive higher priority for jammer inhibiting, e.g., if resources are unavailable for inhibiting the single-tone jammer and the multi-tone jammer. For example, the processor 710 may determine whether a single-tone jammer signal (e.g., a single-tone jammer signal 1060) exceeds the single-tone-jammer threshold 1030 by more than a sum of signals forming a multi-tone jammer signal (e.g., the signals 1020, 1040) exceed the multi-tone-jammer threshold 1070. In this example, the jammer signal 1060 exceeds the single-tone-jammer threshold 1030 by less than the sum of the signals 1020, 1040 exceed the multi-tone-jammer threshold 1070.

Figure 8:
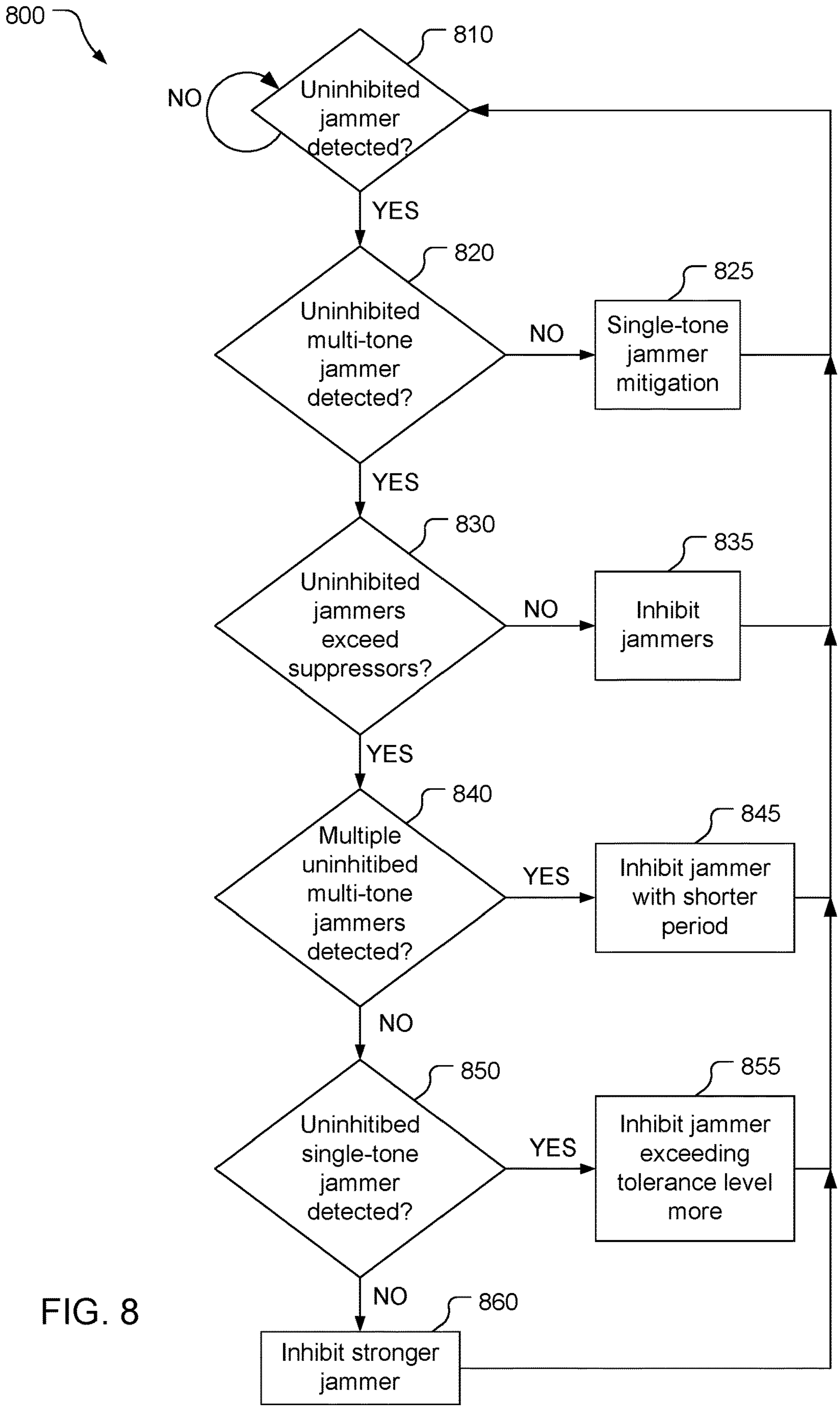
FIG. 8 is a block diagram of a method for selectively inhibiting jammers.

Referring also to FIG. 8, a method 800 for selectively inhibiting jammers, and in particular multi-tone jammers, includes the stages shown. The method 800 is, however, an example and not limiting. The method 800 may be altered, e.g., by having one or more stages added, removed, rearranged, combined, performed concurrently, and/or having single stages split into multiple stages.

At stage 810, the method 800 includes determining whether an uninhibited jammer signal is detected. For example, the processor 710 may determine whether a signal exceeding a threshold energy level, e.g., the threshold 1030, has been received by the receiver 720 and is not presently being inhibited, e.g., by one of the jamming signal inhibitors 781, 782 (e.g., reaches the CPU 790). If not, then the method 800 remains at stage 810. If at least one uninhibited jamming signal is detected at stage 810, then the method 800 proceeds to stage 820.

At stage 820, the method 800 includes determining whether an uninhibited multi-tone jammer is detected. For example, the processor 710 may determine whether multiple jammers are detected that are spaced apart from each other by an integer multiple of kilohertz. If no multi-tone jammer is detected, then the method 800 proceeds to stage 825 where single-tone jammer mitigation is performed to inhibit the single-tone jammer from negatively affecting positioning performance of the mobile device 700 (e.g., ignoring the single-tone jammer or discarding a measurement of the single-tone jammer) and the method 800 returns to stage 810. If a multi-tone jammer is detected at stage 820, then the method 800 proceeds to stage 830.

At stage 830, the method 800 includes determining whether a quantity of uninhibited jammers exceeds a quantity of available jamming signal suppressors. For example, the processor 710 may determine whether a sum of uninhibited multi-tone jamming signal(s) detected and uninhibited single-tone jamming signal(s) (that is/are not part of a multi-tone jamming signal) detected exceeds a quantity of jamming signal suppressors not presently in use inhibiting a jamming signal. If the available jamming signal suppressors meets or exceeds the uninhibited jammers, then the method 800 proceeds to stage 835. At stage 835, the processor 710 controls one or more jamming signal suppressors to inhibit the uninhibited jamming signals (e.g., each single-tone jamming signal and at least one jamming signal of each multi-tone jamming signal), and the method 800 returns to stage 810. In this way, mistaking a peak of a multi-tone jammer as a peak of a true SPS signal may be avoided, thus improving (or at least help avoid degradation of) positioning performance of the mobile device 700 in the presence of jamming signals.

At stage 840, the method 800 includes determining whether multiple uninhibited multi-tone jammers are present. If so, then the method 800 proceeds to stage 845 where the processor 710 may control an available jamming signal suppressor to inhibit a jamming signal of the multi-tone jammer with the shortest (shorter if only two multi-tone jammers are detected) period, e.g., by inhibiting the stronger jamming signal of the multi-tone jammer with the shortest(er) period. In this way, mistaking a peak of a multi-tone jammer as a peak of a true SPS signal may be avoided, thus improving (or at least helping to avoid degradation of) positioning performance of the mobile device 700 in the presence of jamming signals in view of limited resources for inhibiting jammers. This may especially improve performance in the presence of multiple multi-tone jamming signals by prioritizing of inhibiting processing of the multi-tone jamming signal that is more likely to produce a false positive SPS signal peak determination. The method 800 may return to stage 810. If multiple multi-tone jamming signals are not detected at stage 840, then the method 800 proceeds to stage 850.

At stage 850, the method 800 includes determining whether an uninhibited single-tone jammer is detected in addition to the multi-tone jammer. If so, then at stage 855 the processor 710 may, as discussed above, control a signal suppressor to inhibit the jammer that exceeds a respective tolerance level more and the method 800 may return to stage 810. If a single-tone jammer is not detected, then the method 800 may proceed to stage 860 where the processor 710 may control a signal suppressor to inhibit the stronger jamming signal of the pair of jamming signals forming the multi-tone jamming signal. This may improve (or at least help avoid degradation of) positioning performance by inhibiting processing of a jamming signal, in view of limited resources for inhibiting processing, that may reduce positioning accuracy, e.g., avoiding a false positive SPS signal peak determination. The method 800 may return to stage 810.

At stage 810, each activated jamming signal suppressor may be intermittently deactivated to determine whether a respective jamming signal is still being received. If the jamming signal is still being received, then the jamming signal suppressor may be reactivated. If the jamming signal is no longer being received, then the jamming signal suppressor may remain idle if no other jamming signal is received that the jamming signal suppressor can suppress, or may be controlled to suppress another jamming signal that is being received.

Figure 9:
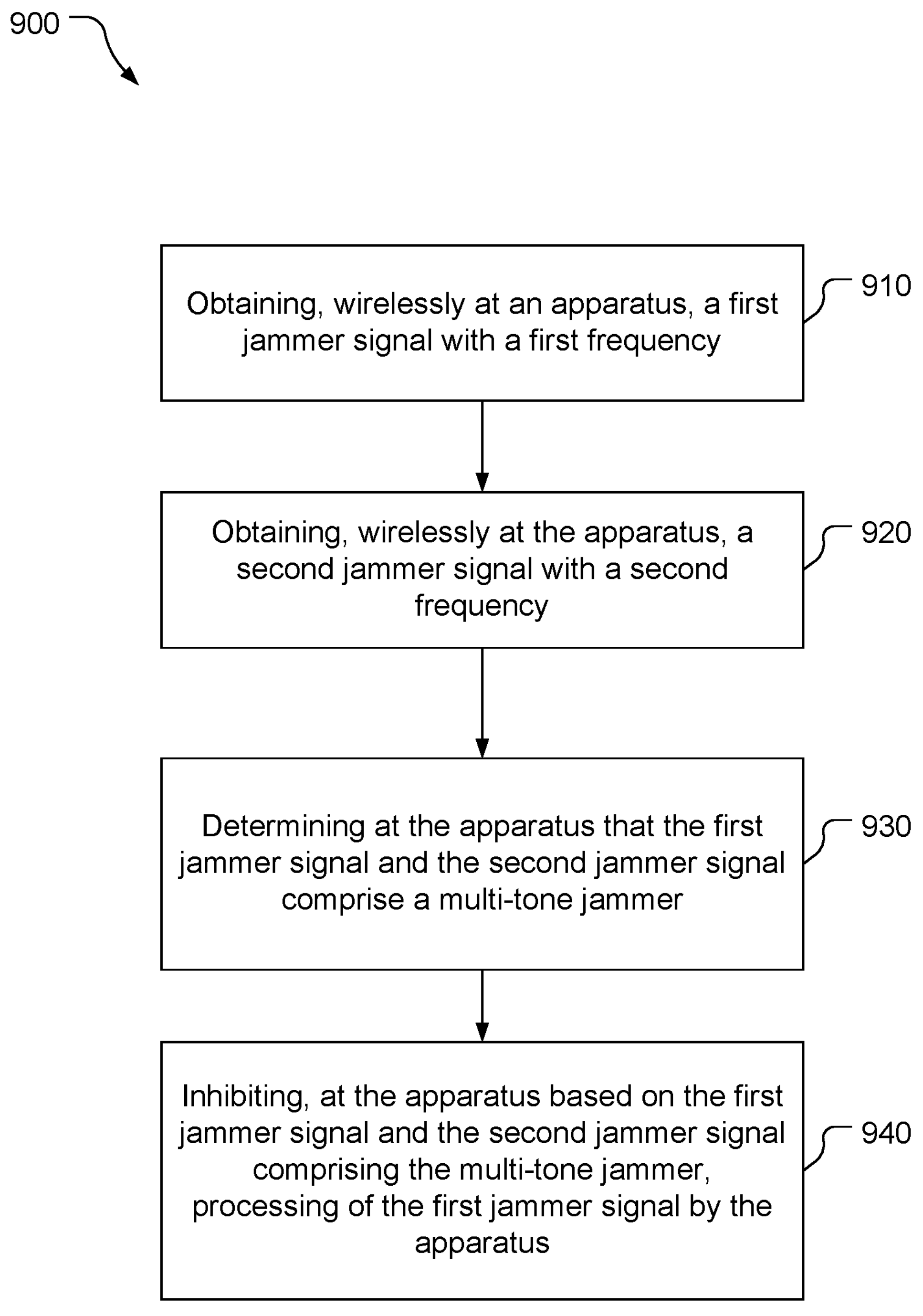
FIG. 9 is a block diagram of a multi-tone jammer mitigation method.

Referring to FIG. 9, with further reference to FIGS. 1-8, a multi-tone jammer mitigation method 900 includes the stages shown. The method 900 is, however, an example and not limiting. The method 900 may be altered, e.g., by having one or more stages added, removed, rearranged, combined, performed concurrently, and/or having single stages split into multiple stages.

At stage 910, the method 900 includes obtaining, wirelessly at an apparatus, a first jammer signal with a first frequency. For example, the receiver 620, e.g., the receiver 720, may receive a first jamming signal. The apparatus may be an example of the mobile device 600 and may or may not be configured for wireless communication. The receiver 620 (e.g., an antenna and possibly a front-end circuit) may comprise means for obtaining the first jammer signal.

At stage 920, the method 900 obtaining, wirelessly at an apparatus, a second jammer signal with a second frequency. For example, the receiver 620, e.g., the receiver 720, may receive a second jamming signal. The receiver 620 (e.g., an antenna and possibly a front-end circuit) may comprise means for obtaining the second jammer signal.

At stage 930, the method 900 includes determining at the apparatus that the first jammer signal and the second jammer signal comprise a multi-tone jammer. For example, the processor 610, e.g., the multi-tone jammer mitigation unit 660 and in particular the spectrum analysis unit 670 may determine one or more pairs of jamming signals (each with an energy level above a threshold, such as the threshold 1030) with respective frequencies that are an integer multiple of kilohertz apart. For example, the processor 610 may identify the signals 1020, 1040 (that each exceed the threshold 1030) as a multi-tone jammer because the frequency separation 1050 is an integer multiple of kHz. The processor 610, possibly in combination with the memory 630, may comprise means for determining that the first jammer signal and the second jammer signal comprise a multi-tone jammer.

At stage 940, the method 900 includes inhibiting, at the apparatus based on the first jammer signal and the second jammer signal comprising the multi-tone jammer, processing of the first jammer signal by the apparatus. For example, the processor 610, e.g., the multi-tone jammer mitigation unit 660, may control the receiver 620, e.g., the processor 710 may control the receiver 720, to inhibit at least one of the pair of jammer signals (e.g., the signals 1020, 1040) that make up the multi-tone jammer. The processor 710 may inhibit processing of the jammer signal so that the jammer signal is not used to determine a range between the apparatus and a source of the first jammer signal, and thus no such range is used to determine a position estimate for the apparatus (which would be an erroneous position estimate). The processor 610, possibly in combination with the memory 630, possibly in combination with the receiver 620 (e.g., the jamming signal inhibitor 781) may comprise means for inhibiting processing of the first jammer signal.

Implementations of the method 900 may include one or more of the following features. In an example implementation, determining that the first jammer signal and the second jammer signal comprise the multi-tone jammer comprises determining that a difference between the first frequency and the second frequency is an integer number of kHz. For example, the processor 710 may determine that the frequency separation 1050 is an integer number of kilohertz. In another example implementation, inhibiting processing of the first jammer signal by the apparatus comprises controlling one or more adjustable filters of the apparatus to selectively inhibit signals of the first frequency from reaching one or more processors of the apparatus. For example, the processor 710 may control a notch filter (or multiple notch filters) of the jamming signal inhibitor 781 to inhibit a jamming signal of a multi-tone jammer from reaching the CPU 790. The processor 710, possibly in combination with the memory 730, may comprise means for controlling one or more adjustable filters to selectively inhibit the first jammer signal. In another example implementation, inhibiting processing of the first jammer signal is based on a first signal strength of the first jammer signal being greater than a second signal strength of the second jammer signal. For example, the processor 710 may selectively inhibit the signal 1020 instead of the signal 1040 due to a signal strength of the signal 1020 being higher than a signal strength of the signal 1040.

Also or alternatively, implementations of the method 900 may include one or more of the following features. In an example implementation, the method 900 includes obtaining, wirelessly at the apparatus, a third jammer signal with a third frequency, wherein inhibiting processing of the first jammer signal comprises inhibiting processing of the first jammer signal over inhibiting processing of the third jammer signal based on the multi-tone jammer exceeding a first tolerance level by more than the third jammer signal exceeds a second tolerance level. For example, the processor 610 may, at stage 855, inhibit the first jammer signal of a multi-tone jammer signal (e.g., the signal 1020) instead of a single-tone jammer signal (e.g., the signal 1060) because the multi-tone jammer exceeds a tolerance level (e.g., the threshold 1070) by more than the single-tone jammer exceeds a single-tone jammer threshold, e.g., the threshold 1030. The receiver 620 (e.g., an antenna and possibly a front-end circuit) may comprise means for obtaining the third jammer signal. In another example implementation, the multi-tone jammer is a first multi-tone jammer, and the method 900 includes: obtaining, wirelessly at the apparatus, a third jammer signal with a third frequency; obtaining, wirelessly at the apparatus, a fourth jammer signal with a fourth frequency; and determining that the third jammer signal and the fourth jammer signal comprise a second multi-tone jammer; where inhibiting processing of the first jammer signal comprises inhibiting processing of the first jammer signal over inhibiting processing of the third jammer signal based on a first period of the first multi-tone jammer being shorter than a second period of the second multi-tone jammer. For example, at stage 840 the processor 610 may determine that multiple multi-tone jammers (e.g., a first MTJ (multi-tone jammer) due to the signals 1020, 1040 and a second MTJ due to the signal 1060 and a signal 1080) are present. The processor 610 may determine that a period of the first MTJ is shorter than a period of the second MTJ due to the frequency of the sinusoidal ridge of each MTJ being proportional to the frequency separation of the STJs (single-tone jammers) forming the respective MTJ. At stage 845 the processor 610 may inhibit either the first jammer signal or the second jammer signal based on the processor 610 determining that the first MTJ has a shorter period than the second MTJ. The processor 610 may select to inhibit the first jammer signal (e.g., the signal 1020) because the first jammer signal has a higher signal strength (at the mobile device 600) than the second jammer signal (e.g., the signal 1040). The receiver 620 (e.g., an antenna and possibly a front-end circuit) may comprise means for obtaining the third jammer signal and means for obtaining the fourth jammer signal. The processor 610, possibly in combination with the memory 630, may comprise means for determining that the third jammer signal and the jammer signal comprise a multi-tone jammer. The processor 610, possibly in combination with the memory 630, possibly in combination with the receiver 620 (e.g., the jamming signal inhibitor 781) may comprise means for inhibiting processing of the first jammer signal over inhibiting processing of the third jammer signal based on a first period of the first multi-tone jammer being shorter than a second period of the second multi-tone jammer.

IMPLEMENTATION EXAMPLES

Implementation examples are provided in the following numbered clauses.

Clause 1. An apparatus comprising:

one or more receivers configured to obtain, wirelessly, a first jammer signal with a first frequency, and configured to obtain, wirelessly, a second jammer signal with a second frequency;

one or more processors, communicatively coupled to the one or more receivers;

wherein the one or more processors are configured to:

determine that the first jammer signal and the second jammer signal comprise a multi-tone jammer; and inhibit, based on the first jammer signal and the second jammer signal comprising the multi-tone jammer, processing of the first jammer signal by the one or more processors.

Clause 2. The apparatus of clause 1, wherein to determine that the first jammer signal and the second jammer signal comprise the multi-tone jammer the one or more processors are configured to determine that a difference between the first frequency and the second frequency is an integer number of kHz.

Clause 3. The apparatus of clause 1, further comprising one or more adjustable filters communicatively coupled to the one or more processors and configured to inhibit signals of a selectable frequency from reaching the one or more processors, wherein to inhibit processing of the first jammer signal by the one or more processors the one or more processors are configured to control the one or more adjustable filters to set the selectable frequency to the first frequency.

Clause 4. The apparatus of clause 1, wherein the one or more processors are configured to inhibit processing of the first jammer signal based on a first signal strength of the first jammer signal being greater than a second signal strength of the second jammer signal.

Clause 5. The apparatus of clause 1, wherein the one or more receivers are configured to obtain, wirelessly, a third jammer signal with a third frequency, and the one or more processors are configured to inhibit processing of the first jammer signal over inhibiting processing of the third jammer signal based on the multi-tone jammer exceeding a first tolerance level by more than the third jammer signal exceeds a second tolerance level.

Clause 6. The apparatus of clause 1, wherein:

the multi-tone jammer is a first multi-tone jammer;

the one or more receivers are configured to obtain, wirelessly, a third jammer signal with a third frequency, and is configured to obtain, wirelessly, a fourth jammer signal with a fourth frequency; and the one or more processors are configured to:

determine that the third jammer signal and the fourth jammer signal comprise a second multi-tone jammer; and inhibit processing of the first jammer signal over inhibiting processing of the third jammer signal based on a first period of the first multi-tone jammer being shorter than a second period of the second multi-tone jammer.

Clause 7. A multi-tone jammer mitigation method comprising:

obtaining, wirelessly at an apparatus, a first jammer signal with a first frequency;

obtaining, wirelessly at the apparatus, a second jammer signal with a second frequency;

determining at the apparatus that the first jammer signal and the second jammer signal comprise a multi-tone jammer; and inhibiting, at the apparatus based on the first jammer signal and the second jammer signal comprising the multi-tone jammer, processing of the first jammer signal by the apparatus.

Clause 8. The multi-tone jammer mitigation method of clause 7, wherein determining that the first jammer signal and the second jammer signal comprise the multi-tone jammer comprises determining that a difference between the first frequency and the second frequency is an integer number of kHz.

Clause 9. The multi-tone jammer mitigation method of clause 7, wherein inhibiting processing of the first jammer signal by the apparatus comprises controlling one or more adjustable filters of the apparatus to selectively inhibit signals of the first frequency from reaching a processor of the apparatus.

Clause 10. The multi-tone jammer mitigation method of clause 7, wherein inhibiting processing of the first jammer signal is based on a first signal strength of the first jammer signal being greater than a second signal strength of the second jammer signal.

Clause 11. The multi-tone jammer mitigation method of clause 7, further comprising obtaining, wirelessly at the apparatus, a third jammer signal with a third frequency, wherein inhibiting processing of the first jammer signal comprises inhibiting processing of the first jammer signal over inhibiting processing of the third jammer signal based on the multi-tone jammer exceeding a first tolerance level by more than the third jammer signal exceeds a second tolerance.

Clause 12. The multi-tone jammer mitigation method of clause 7, wherein the multi-tone jammer is a first multi-tone jammer, and wherein the multi-tone jammer mitigation method further comprises:

obtaining, wirelessly at the apparatus, a third jammer signal with a third frequency;

obtaining, wirelessly at the apparatus, a fourth jammer signal with a fourth frequency; and determining that the third jammer signal and the fourth jammer signal comprise a second multi-tone jammer;

wherein inhibiting processing of the first jammer signal comprises inhibiting processing of the first jammer signal over inhibiting processing of the third jammer signal based on a first period of the first multi-tone jammer being shorter than a second period of the second multi-tone jammer.

Clause 13. An apparatus comprising:

means for obtaining, wirelessly, a first jammer signal with a first frequency;

means for obtaining, wirelessly, a second jammer signal with a second frequency;

means for determining that the first jammer signal and the second jammer signal comprise a multi-tone jammer; and means for inhibiting, based on the first jammer signal and the second jammer signal comprising the multi-tone jammer, processing of the first jammer signal by the apparatus.

Clause 14. The apparatus of clause 13, wherein the means for determining that the first jammer signal and the second jammer signal comprise the multi-tone jammer comprise means for determining that a difference between the first frequency and the second frequency is an integer number of kHz.

Clause 15. The apparatus of clause 13, wherein the means for inhibiting processing of the first jammer signal by the apparatus comprise means for controlling one or more adjustable filters of the apparatus to selectively inhibit signals of the first frequency from reaching a processor of the apparatus.

Clause 16. The apparatus of clause 13, wherein the means for inhibiting processing of the first jammer signal comprise means for inhibiting processing of the first jammer signal based on a first signal strength of the first jammer signal being greater than a second signal strength of the second jammer signal.

Clause 17. The apparatus of clause 13, further comprising means for obtaining, wirelessly, a third jammer signal with a third frequency, wherein the means for inhibiting processing of the first jammer signal comprise means for inhibiting processing of the first jammer signal over inhibiting processing of the third jammer signal based on the multi-tone jammer exceeding a first tolerance level by more than the third jammer signal exceeds a second tolerance level.

Clause 18. The apparatus of clause 13, wherein the multi-tone jammer is a first multi-tone jammer, and wherein the apparatus further comprises:

means for obtaining, wirelessly, a third jammer signal with a third frequency;

means for obtaining, wirelessly, a fourth jammer signal with a fourth frequency; and means for determining that the third jammer signal and the fourth jammer signal comprise a second multi-tone jammer;

wherein the means for inhibiting processing of the first jammer signal comprise means for inhibiting processing of the first jammer signal over inhibiting processing of the third jammer signal based on a first period of the first multi-tone jammer being shorter than a second period of the second multi-tone jammer.

Clause 19. A non-transitory, processor-readable storage medium comprising processor-readable instructions to cause one or more processors, of an apparatus, to:

obtain a first jammer signal with a first frequency;

obtain a second jammer signal with a second frequency;

determine that the first jammer signal and the second jammer signal comprise a multi-tone jammer; and inhibit, based on the first jammer signal and the second jammer signal comprising the multi-tone jammer, processing of the first jammer signal by the apparatus.

Clause 20. The non-transitory, processor-readable storage medium of clause 19, wherein the processor-readable instructions to cause the one or more processors to determine that the first jammer signal and the second jammer signal comprise the multi-tone jammer comprise processor-readable instructions to cause the one or more processors to determine that a difference between the first frequency and the second frequency is an integer number of kHz.

Clause 21. The non-transitory, processor-readable storage medium of clause 19, wherein the processor-readable instructions to cause the one or more processors to inhibit processing of the first jammer signal by the apparatus comprise processor-readable instructions to cause the one or more processors to control one or more adjustable filters of the apparatus to selectively inhibit signals of the first frequency from reaching the one or more processors of the apparatus.

Clause 22. The non-transitory, processor-readable storage medium of clause 19, wherein the processor-readable instructions to cause the one or more processors to the inhibit processing of the first jammer signal comprise processor-readable instructions to cause the one or more processors to inhibit processing of the first jammer signal based on a first signal strength of the first jammer signal being greater than a second signal strength of the second jammer signal.

Clause 23. The non-transitory, processor-readable storage medium of clause 19, further comprising processor-readable instructions to cause the one or more processors to obtain a third jammer signal with a third frequency, wherein the processor-readable instructions to cause the one or more processors to inhibit processing of the first jammer signal comprise processor-readable instructions to cause the one or more processors to inhibit processing of the first jammer signal over inhibiting processing of the third jammer signal based on the multi-tone jammer exceeding a first tolerance level by more than the third jammer signal exceeds a second tolerance level.

Clause 24. The non-transitory, processor-readable storage medium of clause 19, wherein the multi-tone jammer is a first multi-tone jammer, and wherein the processor-readable instructions further comprise processor-readable instructions to cause the one or more processors to:

obtain a third jammer signal with a third frequency;

obtain a fourth jammer signal with a fourth frequency; and determine that the third jammer signal and the fourth jammer signal comprise a second multi-tone jammer;

wherein the processor-readable instructions to cause the one or more processors to inhibit processing of the first jammer signal comprise processor-readable instructions to cause the one or more processors to inhibit processing of the first jammer signal over inhibiting processing of the third jammer signal based on a first period of the first multi-tone jammer being shorter than a second period of the second multi-tone jammer.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms “a,” “an,” and “the” include the plural forms as well, unless the context clearly indicates otherwise. Thus, reference to a device in the singular (e.g., “a device,” “the device”), including in the claims, includes one or more of such devices (e.g., “a processor” includes one or more processors, “the processor” includes one or more processors, “a memory” includes one or more memories, “the memory” includes one or more memories, etc.). The terms “comprises,” “comprising,” “includes,” and/or “including,” as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is “based on” an item or condition means that the function or operation is based on the stated item or condition and may be based on one or more items and/or conditions in addition to the stated item or condition.

Also, as used herein, “or” as used in a list of items (possibly prefaced by “at least one of” or prefaced by “one or more of”) indicates a disjunctive list such that, for example, a list of “at least one of A, B, or C,” or a list of “one or more of A, B, or C” or a list of “A or B or C” means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:

one or more receivers configured to obtain, wirelessly, a first jammer signal with a first frequency, and configured to obtain, wirelessly, a second jammer signal with a second frequency;

one or more processors, communicatively coupled to the one or more receivers; and one or more adjustable filters communicatively coupled to the one or more processors and configured to inhibit signals of a selectable frequency from reaching the one or more processors;

wherein the one or more processors are configured to:

determine that the first jammer signal and the second jammer signal comprise a multi-tone jammer; and inhibit, based on the first jammer signal and the second jammer signal comprising the multi-tone jammer, processing of the first jammer signal by the one or more processors by controlling the one or more adjustable filters to set the selectable frequency to the first frequency, wherein the one or more receivers are configured to obtain, wirelessly, a third jammer signal with a third frequency, and the one or more processors are configured to inhibit processing of the first jammer signal over inhibiting processing of the third jammer signal based on the multi-tone jammer exceeding a first tolerance level by more than the third jammer signal exceeds a second tolerance level.

2. The apparatus of claim 1, wherein to determine that the first jammer signal and the second jammer signal comprise the multi-tone jammer the one or more processors are configured to determine that a difference between the first frequency and the second frequency is an integer number of kHz.

3. The apparatus of claim 1, wherein the one or more processors are configured to inhibit processing of the first jammer signal based on a first signal strength of the first jammer signal being greater than a second signal strength of the second jammer signal.

4. An apparatus comprising:

one or more receivers configured to obtain, wirelessly, a first jammer signal with a first frequency, and configured to obtain, wirelessly, a second jammer signal with a second frequency; and one or more processors, communicatively coupled to the one or more receivers;

wherein the one or more processors are configured to:

determine that the first jammer signal and the second jammer signal comprise a multi-tone jammer; and inhibit, based on the first jammer signal and the second jammer signal comprising the multi-tone jammer, processing of the first jammer signal by the one or more processors;

the one or more receivers are configured to obtain, wirelessly, a third jammer signal with a third frequency, and is configured to obtain, wirelessly, a fourth jammer signal with a fourth frequency; and the one or more processors are configured to:

determine that the third jammer signal and the fourth jammer signal comprise a second multi-tone jammer; and inhibit processing of the first jammer signal over inhibiting processing of the third jammer signal based on a first period of the first multi-tone jammer being shorter than a second period of the second multi-tone jammer.

5. A multi-tone jammer mitigation method comprising:

obtaining, wirelessly at an apparatus, a first jammer signal with a first frequency;

obtaining, wirelessly at the apparatus, a second jammer signal with a second frequency;

determining at the apparatus that the first jammer signal and the second jammer signal comprise a multi-tone jammer;

inhibiting, at the apparatus based on the first jammer signal and the second jammer signal comprising the multi-tone jammer, processing of the first jammer signal by the apparatus by controlling one or more adjustable filters of the apparatus to selectively inhibit signals of the first frequency from reaching one or more processors of the apparatus; and obtaining, wirelessly at the apparatus, a third jammer signal with a third frequency, wherein inhibiting processing of the first jammer signal comprises inhibiting processing of the first jammer signal over inhibiting processing of the third jammer signal based on the multi-tone jammer exceeding a first tolerance level by more than the third jammer signal exceeds a second tolerance.

6. The multi-tone jammer mitigation method of claim 5, wherein determining that the first jammer signal and the second jammer signal comprise the multi-tone jammer comprises determining that a difference between the first frequency and the second frequency is an integer number of kHz.

7. The multi-tone jammer mitigation method of claim 5, wherein inhibiting processing of the first jammer signal is based on a first signal strength of the first jammer signal being greater than a second signal strength of the second jammer signal.

8. A multi-tone jammer mitigation method comprising:

obtaining, wirelessly at an apparatus, a first jammer signal with a first frequency;

obtaining, wirelessly at the apparatus, a second jammer signal with a second frequency;

determining at the apparatus that the first jammer signal and the second jammer signal comprise a first multi-tone jammer; and inhibiting, at the apparatus based on the first jammer signal and the second jammer signal comprising the multi-tone jammer, processing of the first jammer signal by the apparatus;

obtaining, wirelessly at the apparatus, a third jammer signal with a third frequency;

obtaining, wirelessly at the apparatus, a fourth jammer signal with a fourth frequency; and determining that the third jammer signal and the fourth jammer signal comprise a second multi-tone jammer;

wherein inhibiting processing of the first jammer signal comprises inhibiting processing of the first jammer signal over inhibiting processing of the third jammer signal based on a first period of the first multi-tone jammer being shorter than a second period of the second multi-tone jammer.

9. An apparatus comprising:

means for obtaining, wirelessly, a first jammer signal with a first frequency;

means for obtaining, wirelessly, a second jammer signal with a second frequency;

means for determining that the first jammer signal and the second jammer signal comprise a multi-tone jammer;

means for inhibiting, based on the first jammer signal and the second jammer signal comprising the multi-tone jammer, processing of the first jammer signal by the apparatus, including means for controlling one or more adjustable filters of the apparatus to selectively inhibit signals of the first frequency from reaching one or more processors of the apparatus; and means for obtaining, wirelessly, a third jammer signal with a third frequency, wherein the means for inhibiting processing of the first jammer signal comprise means for inhibiting processing of the first jammer signal over inhibiting processing of the third jammer signal based on the multi-tone jammer exceeding a first tolerance level by more than the third jammer signal exceeds a second tolerance level.

10. The apparatus of claim 9, wherein the means for determining that the first jammer signal and the second jammer signal comprise the multi-tone jammer comprise means for determining that a difference between the first frequency and the second frequency is an integer number of kHz.

11. The apparatus of claim 9, wherein the means for inhibiting processing of the first jammer signal comprise means for inhibiting processing of the first jammer signal based on a first signal strength of the first jammer signal being greater than a second signal strength of the second jammer signal.

12. An apparatus comprising:

means for obtaining, wirelessly, a first jammer signal with a first frequency;

means for obtaining, wirelessly, a second jammer signal with a second frequency;

means for determining that the first jammer signal and the second jammer signal comprise a first multi-tone jammer; and means for inhibiting, based on the first jammer signal and the second jammer signal comprising the multi-tone jammer, processing of the first jammer signal by the apparatus;

means for obtaining, wirelessly, a third jammer signal with a third frequency;

means for obtaining, wirelessly, a fourth jammer signal with a fourth frequency; and means for determining that the third jammer signal and the fourth jammer signal comprise a second multi-tone jammer;

wherein the means for inhibiting processing of the first jammer signal comprise means for inhibiting processing of the first jammer signal over inhibiting processing of the third jammer signal based on a first period of the first multi-tone jammer being shorter than a second period of the second multi-tone jammer.

13. A non-transitory, processor-readable storage medium comprising processor-readable instructions to cause one or more processors, of an apparatus, to:

obtain a first jammer signal with a first frequency;

obtain a second jammer signal with a second frequency;

determine that the first jammer signal and the second jammer signal comprise a multi-tone jammer;

inhibit, based on the first jammer signal and the second jammer signal comprising the multi-tone jammer, processing of the first jammer signal by the apparatus by controlling one or more adjustable filters of the apparatus, that are configured to inhibit signals of a selectable frequency from reaching the one or more processors, to set the selectable frequency to the first frequency; and obtain a third jammer signal with a third frequency, wherein the processor-readable instructions to cause the one or more processors to inhibit processing of the first jammer signal comprise processor-readable instructions to cause the one or more processors to inhibit processing of the first jammer signal over inhibiting processing of the third jammer signal based on the multi-tone jammer exceeding a first tolerance level by more than the third jammer signal exceeds a second tolerance level.

14. The non-transitory, processor-readable storage medium of claim 13, wherein the processor-readable instructions to cause the one or more processors to determine that the first jammer signal and the second jammer signal comprise the multi-tone jammer comprise processor-readable instructions to cause the one or more processors to determine that a difference between the first frequency and the second frequency is an integer number of kHz.

15. The non-transitory, processor-readable storage medium of claim 13, wherein the processor-readable instructions to cause the one or more processors to the inhibit processing of the first jammer signal comprise processor-readable instructions to cause the one or more processors to inhibit processing of the first jammer signal based on a first signal strength of the first jammer signal being greater than a second signal strength of the second jammer signal.

16. A non-transitory, processor-readable storage medium comprising processor-readable instructions to cause one or more processors, of an apparatus, to:

obtain a first jammer signal with a first frequency;

obtain a second jammer signal with a second frequency;

determine that the first jammer signal and the second jammer signal comprise a first multi-tone jammer; and inhibit, based on the first jammer signal and the second jammer signal comprising the multi-tone jammer, processing of the first jammer signal by the apparatus;

obtain a third jammer signal with a third frequency;

obtain a fourth jammer signal with a fourth frequency; and determine that the third jammer signal and the fourth jammer signal comprise a second multi-tone jammer;

wherein the processor-readable instructions to cause the one or more processors to inhibit processing of the first jammer signal comprise processor-readable instructions to cause the one or more processors to inhibit processing of the first jammer signal over inhibiting processing of the third jammer signal based on a first period of the first multi-tone jammer being shorter than a second period of the second multi-tone jammer.

* * * * *